United States Patent

Hara et al.

[11] Patent Number: 5,770,134
[45] Date of Patent: Jun. 23, 1998

[54] MANUFACTURING METHOD FOR MULTI-LAYER MOLDED-PRODUCT CONSISTING OF A BASE HAVING HOLES THROUGH AND A COVERING MATERIAL

[75] Inventors: Takahisa Hara, Hyogo; Masahito Matsumoto, Osaka, both of Japan

[73] Assignee: Sumitomo Chemical Co., Ltd., Osaka, Japan

[21] Appl. No.: 81,158

[22] Filed: Jun. 25, 1993

[30] Foreign Application Priority Data

Jul. 1, 1992 [JP] Japan .................................. 4-174177
Jul. 1, 1992 [JP] Japan .................................. 4-174180

[51] Int. Cl.⁶ .................................................. B29C 45/16
[52] U.S. Cl. ........................ 264/154; 264/251; 264/257; 264/266; 264/278
[58] Field of Search .................................. 264/257, 266, 264/267, 273, 275, 154, 163, 546, 251, 155, 156, 278

[56] References Cited

U.S. PATENT DOCUMENTS

| | | |
|---|---|---|
| 1,895,738 | 1/1933 | Shugg et al. . |
| 3,077,658 | 2/1963 | Wharton .................................. 264/156 |
| 3,699,204 | 10/1972 | Ogata ...................................... 264/154 |
| 4,381,908 | 5/1983 | Roth ........................................ 264/278 |
| 4,427,615 | 1/1984 | Eskesen .................................. 264/278 |
| 4,803,030 | 2/1989 | Kobayashi ............................. 264/278 |
| 4,824,069 | 4/1989 | Shoji et al. ............................. 264/257 |
| 4,847,034 | 7/1989 | Araki et al. ............................. 264/553 |
| 5,006,188 | 4/1991 | Usui et al. .............................. 264/511 |
| 5,034,076 | 7/1991 | Masui et al. ............................ 264/257 |
| 5,049,337 | 9/1991 | Katagiri et al. ........................ 264/155 |
| 5,158,729 | 10/1992 | Gemeinhardt .......................... 264/154 |
| 5,342,569 | 8/1994 | Murasaki ................................ 264/278 |

FOREIGN PATENT DOCUMENTS

| | | |
|---|---|---|
| 0343755 | 11/1989 | European Pat. Off. . |
| 0370476 | 5/1990 | European Pat. Off. . |
| 2530985 | 2/1984 | France . |
| 59-093316 | 5/1984 | Japan . |
| 59-93316 | 5/1984 | Japan . |
| 59-129111 | 7/1984 | Japan . |
| 59-150740 | 8/1984 | Japan . |
| 59-150741 | 8/1984 | Japan . |
| 63-60722 | 3/1988 | Japan . |
| 63-159022 | 7/1988 | Japan . |
| 2214860 | 9/1989 | United Kingdom . |

OTHER PUBLICATIONS

"Flash Free Compression Molding Process" (IBM Technical Disclosure Bulletin, vol. 13, No. 7, Dec. 1970, p. 1838).

Primary Examiner—Angela Ortiz
Attorney, Agent, or Firm—Birch, Stewart, Kolasch & Birch, LLP

[57] ABSTRACT

A method for manufacturing multi-layer molded-products, including the steps of supplying molten thermoplastic resin between an upper mold and a lower mold, and applying pressure to a forming cavity by clamping in a forming process. With this method, it is possible to easily produce a multi-layer molded-product wherein the covering material, such as a woven fabric, is entangledly fused to and integrally formed on the surface of a base plate with at least one hole that is made of thermoplastic resin.

12 Claims, 4 Drawing Sheets

MANUFACTURING METHOD FOR MULTI-LAYER MOLDED-PRODUCT CONSISTING OF A BASE HAVING HOLES THROUGH AND A COVERING MATERIAL

BACKGROUND OF THE INVENTION

1. Field of the Invention

The present invention relates to a manufacturing device and a manufacturing method for providing a multi-layer molded-product wherein a covering material is fused to and integrally formed on the surface of a base plate made of a thermoplastic resin with at least one hole formed in the base plate.

2. Description of Related Art

It has been known in the art that a protective jacket component is used for covering a sound-generating source such as a speaker. In order to achieve the combined objectives of protection and better external appearance, this arrangement has been adopted in various audio equipment such as radios, stereo audio equipment and televisions, and is typically seen in such equipment as speaker boxes and microphones.

Generally, such multi-layer molded-products for use as jacket components are manufactured by bonding a covering material with adhesive to the surface of a preformed base plate that is made of thermoplastic resin with at least one hole formed therein.

However, the conventional method requires a plurality of processes including a process for forming a through hole in a base plate beforehand, a coating process for an adhesive or the like, and a laminating process that follows the foregoing processes, which makes the manufacturing of the multi-layer molded-products expensive. Further, such a method has also given rise to another problem that the covering material might come off during transportation or in use due to contact with another piece of equipment or deterioration of the adhesive, thereby causing a serious adverse effect on the reliability of the products.

SUMMARY OF THE INVENTION

It is an object of the present invention to provide a manufacturing device for multi-layer molded-products as well as a manufacturing method for the multi-layer molded-products by which highly-reliable multi-layer molded-products can be produced and cost reduction of the production can also be achieved.

In order to achieve the above objective, the manufacturing device for the multi-layer molded-products of the present invention is provided with: a mold having a pair of upper and lower molds, one of which is a movable mold and the other is a fixed mold; and a movable member that pushes a covering material against the molding surface of the upper or lower mold and that is capable of retreating out of the cavity of the mold. Here, the movable member is installed in at least either the upper mold or the lower mold.

With the above arrangement, molten thermoplastic resin is supplied to the mold with the covering material such as a woven fabric being tightly pushed against the molding face of the upper or the lower mold by the use of the movable member, and a forming process is then conducted by applying pressure by means of clamping. Thus, it is possible to easily produce a multi-layer molded-product wherein the covering material is fused to and integrally formed on the surface of the thermoplastic resin. Moreover, this multi-layer molded-product has a through hole formed therein at a place where the movable member was previously disposed, and the through hole is covered with the covering material. Accordingly, this arrangement makes it possible to easily produce a multi-layer molded-product with a through hole that is covered with a covering material.

In order to achieve the above objective, the manufacturing method for the multi-layer molded-products of the present invention is characterized in that: molten thermoplastic resin is supplied to the cavity with the covering material being tightly pushed against the molding face of a mold by the use of a movable member that can be moved up and down; and a forming process is then conducted by applying pressure by means of clamping.

With the above method, the forming process is conducted with the covering material such as a woven fabric being tightly pushed against the molding face of the mold. Thus, it is possible to easily produce a multi-layer molded-product wherein the covering material is fused to and integrally formed on the surface of the thermoplastic resin. Moreover, this multi-layer molded-product has a through hole formed therein at a place where the movable member was previously disposed, and the hole is covered with the covering material. Accordingly, this method makes it possible to easily produce a multi-layer molded-product that is includes a base plate made of thermoplastic resin with a hole formed therein that is covered with a covering material.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 5 show one embodiment of the present invention.

FIG. 1 is a schematic cross-sectional side view showing a manufacturing device for a multi-layer molded-product;

FIGS. 2(a) through 2(d) show a manufacturing method for the multi-layer molded-product that is operated using the manufacturing device of FIG. 1;

FIG. 2(a) is an explanatory drawing showing the first step of the manufacturing process.

FIG. 2(b) is an explanatory drawing showing the second step of the manufacturing process.

FIG. 2(c) is an explanatory drawing showing the third step of the manufacturing process.

FIG. 2(d) is an explanatory drawing showing the fourth step of the manufacturing process.

FIG. 3(a) is an explanatory drawing showing a first variation of the structures of an upper and lower molds;

FIG. 3(b) is an explanatory drawing showing a second variation of the structures of the upper and lower molds;

FIG. 3(c) is an explanatory drawing showing a third variation of the structures of the upper and lower molds;

FIG. 3(d) is an explanatory drawing showing a fourth variation of the structures of the upper and lower molds;

FIG. 3(e) is an explanatory drawing showing a fifth variation of the structures of the upper and lower molds;

FIG. 3(f) is an explanatory drawing showing a sixth variation of the structures of the upper and lower molds;

FIG. 4 is a perspective view of the front panel of an audio device, which shows one example of the multi-layer molded-products; and FIG. 5 is a cross-sectional view taken along the line 5—5 of the multi-layer molded-product of the audio device shown in FIG. 4.

DETAILED DESCRIPTION OF THE PREFERRED EMBODIMENTS

Referring to FIGS. 1 through 5, the following description will discuss one embodiment of the present invention.

Figure 4:
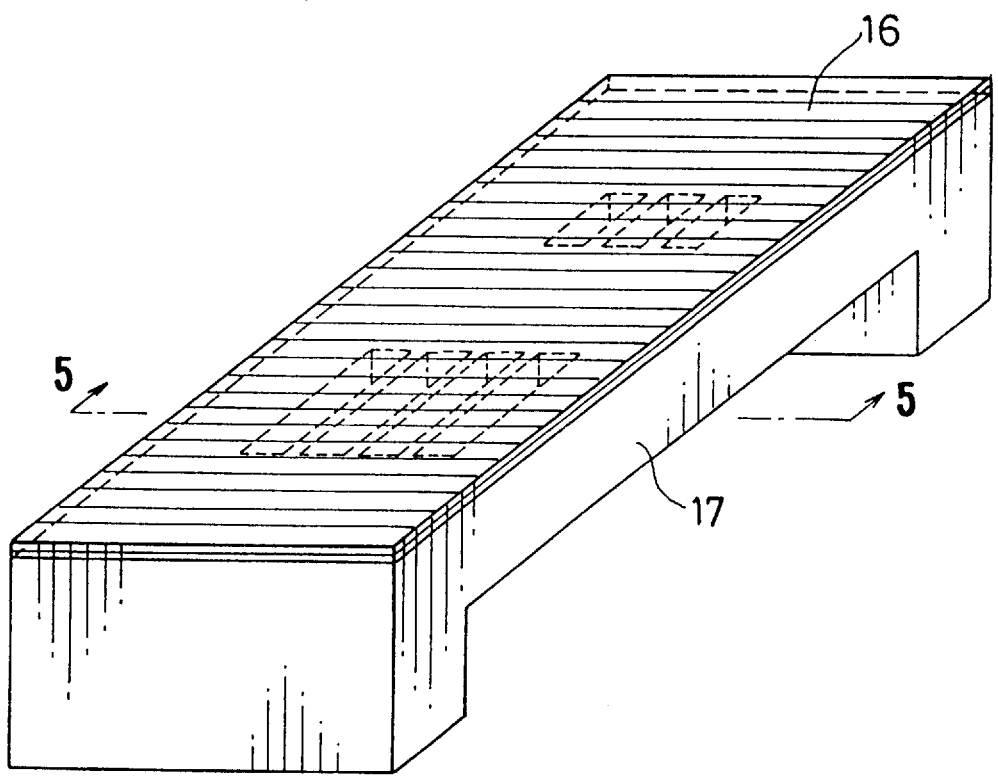
Figure 5:
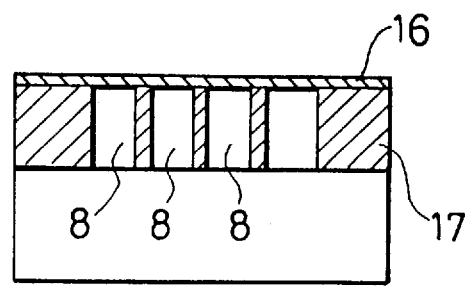

FIGS. 4 and 5 show a front panel used in an audio device such as a radio or a stereo system, which gives one example of a multi-layer molded product. The front panel is constituted of a base plate 17 made of thermoplastic resin and a covering material 16 such as a woven fabric. The covering material 16 is entangledly fused to and integrally formed on the surface of the base plate 17. The base plate 17 is provided with a plurality of through holes 8 for furnishing paths for sound from the speaker (not shown).

Figure 1:
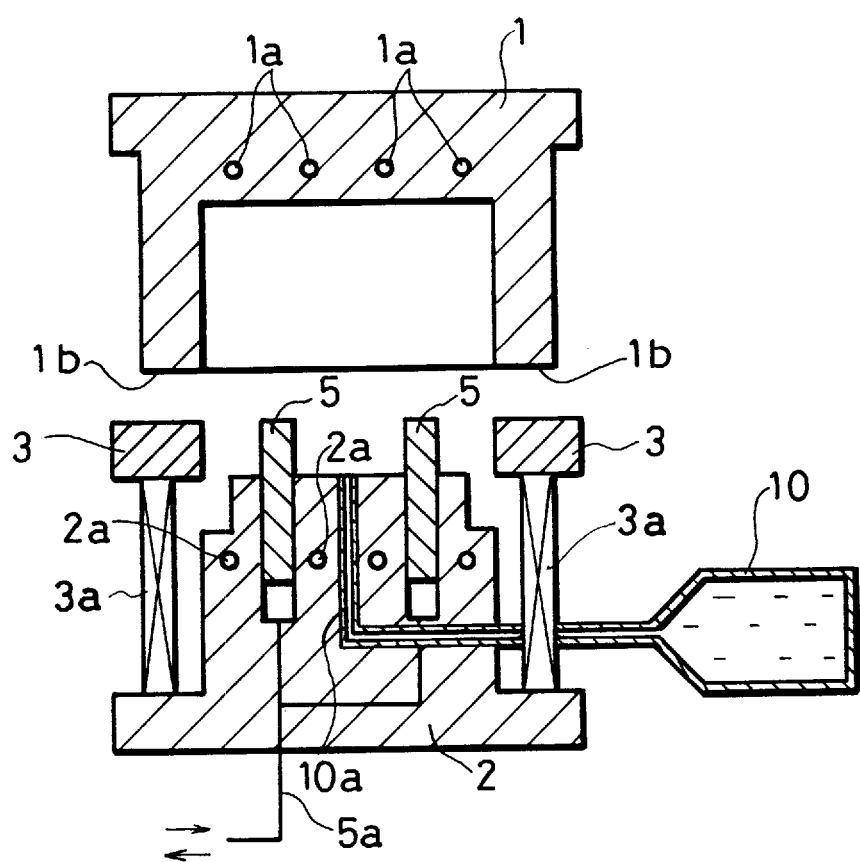
Figure 2:
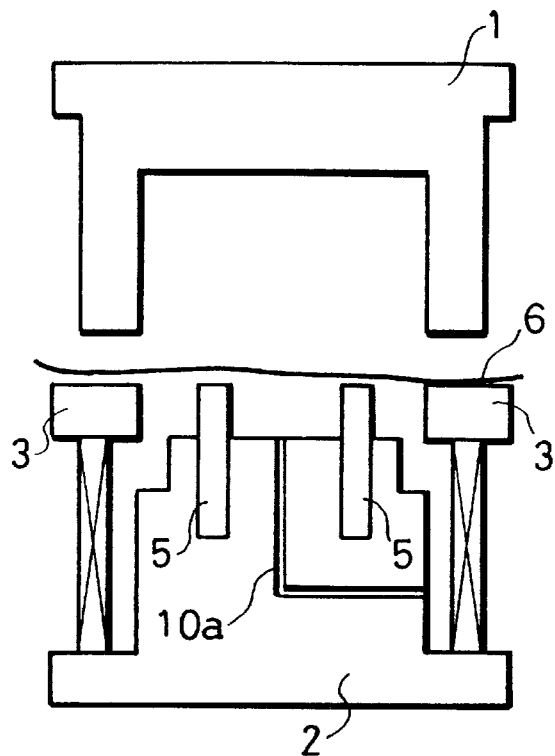
Figure 2:
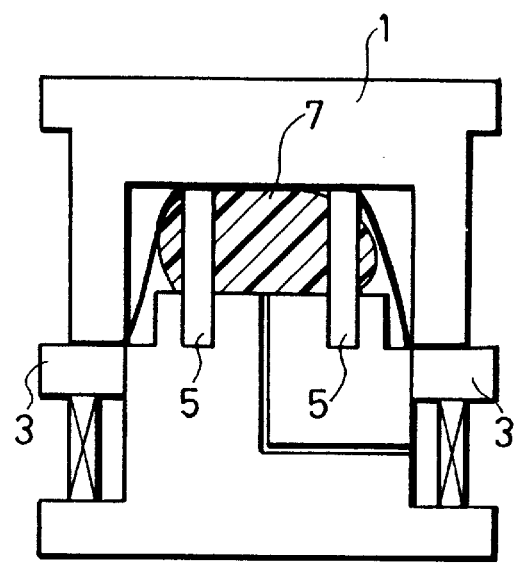
Figure 2:
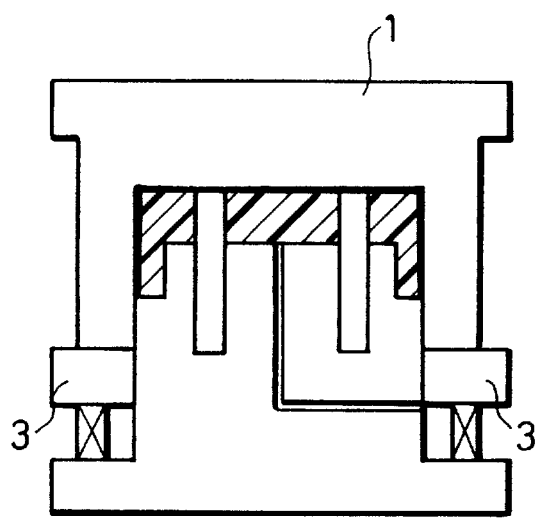
Figure 2:
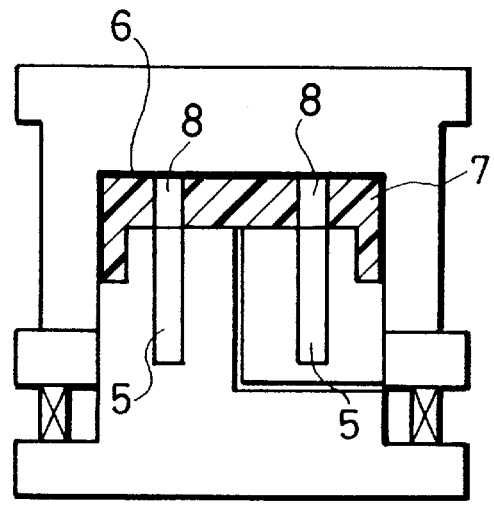

As shown in FIG. 1, a press molding device for manufacturing the front panel is provided with an upper mold 1 and a lower mold 2. The upper mold 1 can be moved up and down, and when the upper mold 1 is moved down, a cavity which has the shape of a multi-layer molded product is formed between the upper mold 1 and the lower mold 2. The upper and lower molds 1 and 2 respectively have paths 1a and 2a through which cooling water is directed. The lower mold 2 is further provided with a conduit 10a for leading the molten resin from a heating device 10 to the cavity, an oil pressure transmitting system 5a, and pins 5 (movable members) that are permitted to move up and down by oil pressure from the oil pressure transmitting system 5a and to protrude out into the cavity. The pins 5 are used for forming through holes 8 in the base plate 17, which will be described later. For this reason, the pins 5 are formed into shapes that fit the cross-sectional shapes of the through holes 8.

On the periphery of the lower mold 2, are installed movable pads 3 (support means) that are urged upward by urging members 3a utilizing oil pressure, air pressure or a spring force. The covering material 16 is sandwiched between the upper face of the pads 3 and the lower face 1b of the upper mold 1 by lowering the upper mold 1, and brought to a semi-clamped state. Here, the semi-clamped state refers to a state wherein the covering material 16 is easily pushed up by the pins 5 without causing any slackness.

As illustrated in FIG. 2(a), in manufacturing the front panel, a woven fabric 6 used as a material of the covering material 16 is spread over and placed on the pads 3. At this time, the height of the pins 5 is adjusted by oil pressure from the oil pressure transmitting system 5a so that the height of the upper face of the pins 5 becomes coincident with the height of the upper face of the pads 3. This adjustment is preferable because it prevents the woven fabric from hanging down.

As illustrated in FIG. 2(b), the upper mold 1 is then lowered. In this case, the lower station of the upper mold 1 is determined so that the clearance to be formed between the upper mold 1 and the lower mold 2 becomes slightly larger than the clearance between them at the final stage of forming the cavity, that is, slightly larger than the thickness of a front panel to be produced. As the upper mold 1 is lowered, the lower face 1b of the upper mold 1 presses the pads 3, and the pads 3 are lowered together with the woven fabric 6. Thus, the woven fabric 6 is semi-clamped between the lower face 1b of the upper mold 1 and the upper face of the pads 3. The pins 5 are then raised in such a manner that the woven fabric 6 is pushed up and tightly pushed against the inner face of the upper mold 1 on the cavity side. Here, since the woven fabric 6 has been semi-clamped, it is easily pushed up without any slackness. Successively, molten resin 7, which has been prepared by heating thermoplastic resin in the heating device 10, is supplied between the woven fabric 6 and the lower mold 2 through the conduit 10a.

As illustrated in FIG. 2(c), the upper mold 1 is further lowered to the final position. As a result, the molten resin 7 spreads through the whole area of the cavity, and a forming process under pressure is carried out. The woven fabric 6 is forced to spread by the molten resin 7, and pushed against the inner face of the upper mold 1. Thus, the molten resin 7 enters gaps between fibers of the woven fabric 6 except the portions at which the woven fabric 6 is pushed against the inner face of the upper mold 1 by the pins 5.

Cooling water is directed through the paths 1a and 2a, thereby cooling off the upper mold 1 and the lower mold 2. Consequently, the molten resin 7, which is in contact with the upper mold 1, the lower mold 2 and the pins 5, is subjected to a temperature drop, and starts to harden. As soon as the surface of the molten resin 7 has hardened enough to retain the shape of the front panel, the pins 5 are lowered and pulled into the lower mold 2.

As illustrated in FIG. 2(d), with this process, the through holes 8 are formed only in the portion made of resin. After the molten resin 7 has sufficiently cooled off and perfectly hardened, the upper mold 1 is raised to open the molds. Thus, a completed front panel, wherein the base plate 17 and the woven fabric 6 as a covering material 16 are integrally formed, is taken out.

As described above, in accordance with the press molding device of the present invention, it is possible to easily produce a front panel wherein by pressing the woven fabric 6 against the inner face of the upper mold 1 by the use of the pins 5, the woven fabric 6 is entangledly fused to and integrally formed on the surface of the base plate 17 made of thermoplastic resin, and the through holes 8 are formed only in the base plate 17.

More specifically, as the thermoplastic resin used for the base plate 17, the following materials are preferably adopted: polyethylene, polypropylene, copolymers comprising ethylene or propylene, ABS resin, styrene base resins, polyamide resin, polyester resin, polymer alloys or mixtures thereof.

Further, in the case of multi-layer molded-products wherein superior heat-resistance is required, that is, those used for cases for car stereo sets, materials such as heat-resisting ABS are preferably adopted. Additionally, any type of thermoplastic resins can be adopted as long as they are suitable for injection molding and press molding.

For use as the covering material 16, in addition to materials such as woven fabric, knitted fabric and unwoven fabric made of various fibers like polyester fiber and polyamide fiber, the following materials may be adopted: net-like materials having a network structure such as wire mesh; perforated materials such as thin plates of metals or resins with a large number of perforations; sheets or films made of thermoplastic resins or thermoplastic elastomers; and foamed materials including those of thermoplastic resins (for example, resins of the polyolefine family, resins of the polyvinyl chloride family, resins of the polystyrene family), those of thermosetting resins (for example, resins of polyurethane family) and those of rubbers (for example, cis-1, 4-polybutadiene, ethylene-propylene copolymer). These materials may be individually used, or may be adopted as a composite material wherein two or more of these are appropriately combined and laminated. Further, irregular patterns such as embossings may be provided on the surface of these materials.

In the use of the covering material 16, preheating may be applied thereto in order to adjust the tensile strength or extension of the covering material 16, and preforming may also be applied thereto.

In the case where the covering material 16 melts with the thermoplastic resin, they are mutually welded, that is, thermal welding takes place, and the thermoplastic resin and the covering material 16 are integrally molded into one piece. Here, thermal welding is defined as one type of "entangled fusing". Further, in the case where the covering material 16, which has a fibrous structure, does not melt by heat, or has a extremely high melting temperature, edges of the fibers enter the molten thermoplastic resin, that is, the so-called anchoring takes place, and the thermoplastic resin and the covering material 16 are integrally molded into one piece. Here, anchoring is defined as one type of "entangled fusing". Furthermore, in the case where the covering material 16 is a net-like material having a network structure or a thin plate made of a metal or a resin having a large number of perforations, the molten thermoplastic resin partially fills in the spaces between the meshes or the perforations, that is, the so-called keying takes place, and the thermoplastic resin and the covering material 16 are integrally formed into one piece. Here, keying is defined as one type of "entangled fusing".

Additionally, if a thin plate made of a metal or a resin having a number of perforations is adopted as the covering material 16, the surface of the thin film to face the thermoplastic resin may be preliminarily provided with an uneven pattern or may be preliminarily machined to make its surface rough. This makes it possible to obtain stronger integrally molded-products because the fusing effect is further stimulated.

Moreover, in the case where the covering material 16 hardly melts by heat with the thermoplastic resin that is to form the base plate 17, a film or a sheet, which is easily welded by heat with thermoplastic resin, may be sandwiched between the thermoplastic resin and the covering material. This makes it possible to obtain stronger integrally molded-products. For this arrangement, the film or the sheet may be preliminarily affixed to the back of the covering material 16. The film or the sheet may be provided with holes, on demand, at the places that correspond to the through holes 8.

The covering material 16 is not necessarily affixed to the base plate 17 over the whole area thereof: it may be partially affixed thereto depending on the use conditions and the commodity shapes of the multi-layer molded-products. If the particular multi-layer molded-product is, for example, a speaker box, the covering material 16 may be fused only to the surface side of the component whereto the speaker is attached.

If the particular multi-layer molded-product is used for an audio device, it is necessary to furnish at least one through hole 8 for providing a path for sound. The number, the size and the shape of the through holes 8 are respectively determined taking into account specific service objectives. As illustrated in FIG. 4, the through holes 8 may be provided as a number of thin cylindrical perforations, or as cutouts having a lattice-shape or a mesh-shape. The through holes 8 may also be provided as a few comparatively large cutouts having a circular shape or other shape. The through holes 8 are normally covered with the covering material 16.

However, in the case of a multi-layer molded-product such as a cabinet for television set where axes for volumes and push buttons are provided in a penetrated manner in the proximity of the installation station of the speaker, the through holes 8 need not be covered with the covering material 16.

As described above, in accordance with the manufacturing method for the multi-layer molded-products of the present invention, since the covering material is entangledly fused to and integrally formed on the surface of the thermoplastic resin, it is possible to easily produce a multi-layer molded-product such as a front panel that has through holes 8 having a complicated shape. Thus, cost reduction is achieved in manufacturing the multi-layer molded-products, and high reliability of the products is ensured.

Figure 3A:
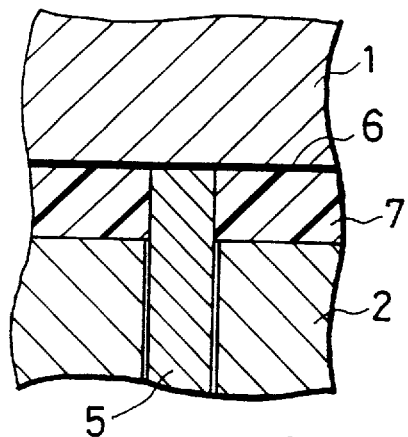
FIGS. 3(a) through 3(f) show variations of the structures of the upper and lower molds of FIG. 1.
Figure 3B:
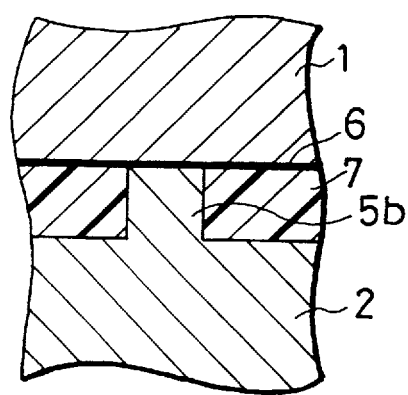

As illustrated in FIG. 3(a), in the above-mentioned press molding device, the pins 5 that can be moved up and down are installed in the lower mold 2, and the woven fabric 6 is pushed against the inner face of the upper mold 1 by the pins 5. As illustrated in FIG. 3(b), instead of these pins 5, protrusions 5b may be installed on the upper face of the lower mold 2, and the woven fabric 6 may be pushed against the inner face of the upper mold 1 by the protrusions 5b; this arrangement provides almost the same function and effect.

Figure 3C:
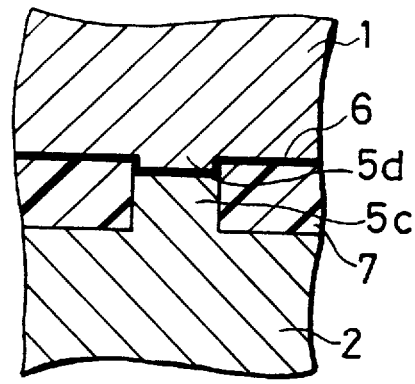
Figure 3D:
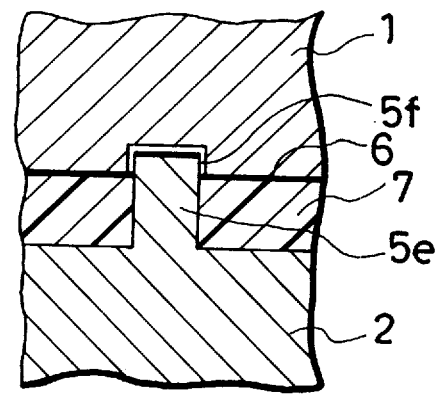

Furthermore, as illustrated in FIG. 3(c), in another arrangement, wherein protrusions 5d are also installed on the inner face of the upper mold 1 so that they are aligned face to face with protrusions 5c on the lower mold 2 and the woven fabric 6 is sandwiched between the protrusions 5c and the protrusions 5d, is adopted, a multi-layer molded-product with the woven fabric 6 inserted into the through holes 8 will be obtained. Moreover, as illustrated in FIG. 3(d), in another arrangement recessed sections 5f are formed in the upper mold 1 so that they are arranged to fit to protrusions 5e on the upper face of the lower mold 2, and the woven fabric 6 is pushed against the inner face of the upper mold 1 by protrusions 5e.

Figure 3E:
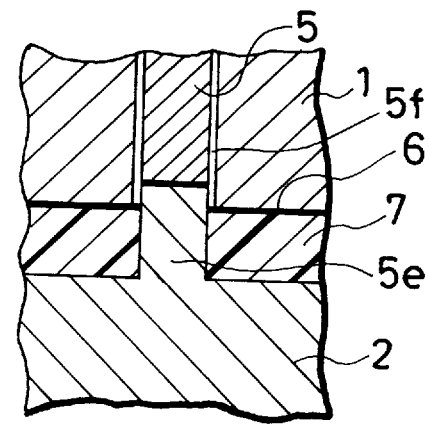

As illustrated in FIG. 3(e), pins 5 that can be moved up and down are installed in the upper mold 1 as well as installing protrusions 5e on the upper face of the lower mold 2 so that they are aligned face to face with the pins 5, and the woven fabric 6 is sandwiched between the pins 5 and the protrusions 5e. The protrusions 5e are adjusted to be longer than the final distance (that is, the thickness of a multi-layer molded-product) between the upper mold 1 and the lower mold 2, the protrusions 5e enter the upper mold 1; this causes the woven fabric 6 to be sheared by the protrusions 5e on the through holes 8, resulting in holes in the woven fabric 6. This arrangement provides a multi-layer molded-product wherein the through holes 8 are not covered with the woven fabric 6.

Figure 3F:
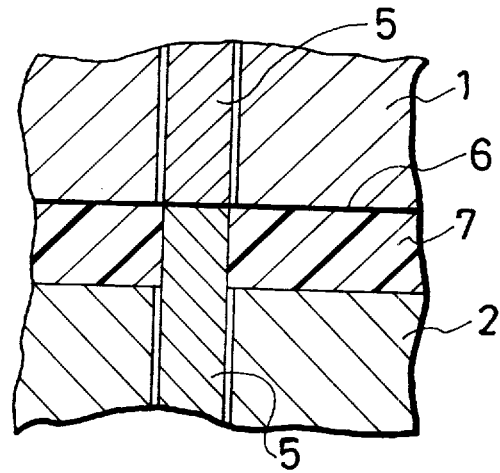

Furthermore, as illustrated in FIG. 3(f), another arrangement, wherein pins 5 that can be moved up and down are installed in the upper mold 1 as well as in the lower mold 2 so that they are aligned face to face with one another, may be adopted. Since the height of the pins 5 of the upper mold 1 and that of the pins 5 of the lower mold 2 are adjustable, this arrangement covers all the arrangements shown in FIGS. 3(a) through 3(f) that are provided with the pins 5, the protrusions 5b through 5e or the recessed sections 5f.

Table 1 summarizes the finished conditions of the front panels that were obtained in the arrangements of FIGS. 3(a) through 3(f) using the pins 5, the protrusions 5b through 5e or the recessed sections 5f. Here, in Table 1, the thin resin skin refers to a thin resin film that remains on the covering material 16 on the through hole 8 side.

In the above-mentioned embodiment, the function of the pads 3 is to push the woven fabric 6 against the lower surface 1b of the upper mold 1 so as to make it semi-clamped. Therefore, as long as they make the woven fabric 6 semi-clamped, the pads 3 are not necessarily disposed all around the lower mold 2.

TABLE 1

|     | Mold Structure | Hole Conditions |
| --- | --- | --- |
| (a) | Movable Pins in Lower Mold | with Covering Material |
| (b) | Protrusions in Lower Mold | with Thin Resin Skin and Covering Material |
| (c) | Protrusions in Upper Mold and in Lower Mold | with Thin Resin Skin and Covering Material |
| (d) | Recessed Sections in Upper Mold Protrusions in Lower Mold | with Holes (without Covering Material) |
| (e) | Movable Pins in Upper Mold Protrusions in Lower Mold | with Holes (without Covering Material) |
| (f) | Movable Pins in Upper Mold and in Lower Mold | Selectable (with or without Covering Material) |

Additionally, in the above-mentioned embodiment, the pins 5 are disposed in the lower mold 2, and the woven fabric 6 is pushed against the inner face of the upper mold 1; yet, of course, it is possible to adopt the reverse arrangement wherein the pins 5 are disposed in the upper mold 1, and the woven fabric 6 is pushed against the inner face of the lower mold 2. Moreover, the upper mold 1 may be disposed as a fixed mold while the lower mold 2 may be disposed as a movable mold. Furthermore, by applying pins that can be moved laterally (movable member, not shown), a multi-layer molded-product having through holes 8 formed on the side face is obtained.

One manufacturing device for multi-layer molded-products in accordance with the present invention is provided with a mold having a pair of upper mold 1 and lower mold 2, the upper mold 1 being a movable mold and the lower mold 2, a fixed mold, and pins 5 that push a covering material 16 against the molding surface of the upper mold 1 and that are capable of retreating out of the cavity are installed in the lower mold 2.

With this arrangement, molten thermoplastic resin is supplied to the cavity with the covering material 16 such as a woven fabric 6 being tightly pushed against the molding face of the upper mold 1 by the use of the pins 5, and a forming process is then conducted by applying pressure by means of clamping. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the pins 5 were previously disposed, and the through holes 8 are covered with the covering material 16. Therefore, this arrangement makes it possible to easily produce a multi-layer molded-product having through holes 8 which are covered with the covering material 16.

Another manufacturing device for multi-layer molded-products in accordance with the present invention is provided with a mold having a pair of upper mold 1 and lower mold 2, the upper mold 1 being a movable mold and the lower mold 2, a fixed mold, and the pads 3 that elastically support the covering material 16 between the upper mold 1 and the lower mold 2 as well as the pins 5 that push a covering material 16 against the molding surface of the upper mold 1 and that are capable of retreating out of the cavity are installed in the lower mold 2.

With this arrangement, when the covering material 16 such as the woven fabric 6 is tightly pushed against the molding face of the upper mold 1, it is avoidable to have the covering material 16 slackened. In other words, it is possible to protect the covering material 16 from wrinkling. Therefore, a high quality finish is available in the multi-layer molded-products.

Still another manufacturing device for multi-layer molded-products in accordance with the present invention is provided with a mold having a pair of upper mold 1 and lower mold 2, the upper mold 1 being a movable mold and the lower mold 2, a fixed mold, and the protrusions 5b that push a covering material 16 against the molding face of the upper mold 1 are installed on the molding face of the lower mold 2.

With this arrangement, molten thermoplastic resin 7 is supplied to the cavity with the covering material 16 such as a woven fabric 6 being tightly pushed against the molding face of the upper mold 1 by the use of the protrusions 5b, and a forming process is then conducted by applying pressure by clamping. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the protrusions 5b were previously disposed, and the through holes 8 are covered with the covering material 16. Therefore, this arrangement makes it possible to easily produce a multi-layer molded-product having through holes 8 which are covered with the covering material 16, and also makes it possible to simplify the structure of the manufacturing device in comparison with the arrangement using the pins 5.

Still another manufacturing device for multi-layer molded-products in accordance with the present invention is provided with a mold having a pair of upper mold 1 and lower mold 2, the upper mold 1 being a movable mold and the lower mold 2, a fixed mold, and the protrusions 5c and 5d which sandwich the covering material 16 are installed on the respective molding faces of the upper and lower molds 1 and 2 so as to be aligned face to face with one another.

With this arrangement, a multi-layer molded-product can be produced wherein the covering material 16 intrudes into the respective through holes 8 in such a manner that it sits slightly recessed in each hole.

Still another manufacturing device for multi-layer molded-products in accordance with the present invention is provided with a mold having a pair of upper mold 1 and lower mold 2, the upper mold 1 being a movable mold and the lower mold 2, a fixed mold, and the protrusions 5e are installed on the molding face of the lower mold 2 while the recessed sections which fit to the protrusions 5e are formed in the upper mold 1.

With this arrangement, it is possible to shear the covering material 16 to make holes therethrough when the protrusions 5e are inserted into the recessed sections. Therefore, this arrangement provides a multi-layer molded-product having through holes 8 which are not covered with the covering material 16.

Still another manufacturing device for multi-layer molded-products in accordance with the present invention is provided with a mold having a pair of upper mold 1 and lower mold 2, the upper mold 1 being a movable mold and the lower mold 2, a fixed mold, and the protrusions 5e are installed on the molding face of the lower mold 2 while the recessed sections 5f which fit to the protrusions are formed in the upper mold 1. Further, the pins 5, which are movable in a sliding manner, are inserted into the recessed sections.

With this arrangement, it is possible to shear holes in the covering material 16 while having the covering material 16 sandwiched between the protrusions 5e and the pins 5. This ensures an accurate perforating operation.

Still another manufacturing device for multi-layer molded-products in accordance with the present invention is provided with a mold having a pair of upper mold 1 and lower mold 2, the upper mold 1 being a movable mold and the lower mold 2, a fixed mold, and the recessed sections are respectively formed in the molding faces of the upper and lower molds 1 and 2 at matching positions thereon. Further, the pins 5 are inserted into the respective recessed sections such that they are movable in a sliding manner between the recessed sections formed in both sides.

With this arrangement, it is possible to readily produce a multi-layer molded-product having through holes 8, and by adjusting the setting heights of the pins 5, both of the two types of structures, that is, one having the through holes 8 covered with the covering material 16 and the other having them not covered with the covering material 16, are available. Thus, cost reduction is achieved in manufacturing the multi-layer molded-products.

A manufacturing method for the multi-layer molded-products in accordance with the present invention is characterized in that: molten thermoplastic resin 7 is supplied to the cavity with the covering material 16 such as a woven fabric 6 being tightly pushed against the molding face of the upper mold 1 by the use of the pins 5 that can be moved up and down; and a forming process is then conducted by applying pressure by means of clamping.

With the above method, the forming process is conducted with the covering material 16 such as the woven fabric 6 being tightly pushed against the molding face of the upper mold 1. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the pins 5 were previously disposed, and the through holes 8 are covered with the covering material 16. Therefore, this method makes it possible to easily produce a multi-layer molded-product that is consisted of the base plate 17 made of thermoplastic resin having through holes 8 which are covered with the covering material 16.

Another manufacturing method for the multi-layer molded-products in accordance with the present invention is characterized in that: molten thermoplastic resin 7 is supplied to the cavity with the covering material 16 such as a woven fabric 6 being tightly pushed against the molding face of the upper mold 1 by the use of the protrusions 5b that are formed on the molding face of the lower mold 2; and a forming process is then conducted by applying pressure by means of clamping.

With the above method, the forming process is conducted with the covering material 16 such as the woven fabric 6 being tightly pushed against the molding face of the upper mold 1. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the protrusions 5b were previously disposed, and the through holes 8 are covered with the covering material 16. Therefore, this method makes it possible to easily produce a multi-layer molded-product that is consisted of the base plate 17 made of thermoplastic resin having through holes 8 which are covered with the covering material 16.

Still another manufacturing method for the multi-layer molded-products in accordance with the present invention is characterized in that: molten thermoplastic resin 7 is supplied to the cavity with the covering material 16 being tightly pushed against the recessed sections so as to make holes in the covering material 16 by the use of the pins 5 that are movable up and down, fitted to the recessed sections formed in the molding face of the upper mold 1; and a forming process is then conducted by applying pressure by means of clamping.

With the above method, the forming process is conducted with the covering material 16 such as the woven fabric 6 being tightly pushed against the molding face of the upper mold 1. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the pins 5 were previously disposed, and the through holes 8 are not covered with the covering material 16. Therefore, this method makes it possible to easily produce a multi-layer molded-product that is consisted of the base plate 17 made of thermoplastic resin having through holes 8 which are not covered with the covering material 16.

Still another manufacturing method for the multi-layer molded-products in accordance with the present invention is characterized in that: molten thermoplastic resin 7 is supplied to the cavity with the covering material 16 being held between the pins 5 that are movable up and down, fitted to the recessed sections formed in the molding faces of the upper and lower molds 1 and 2 at matching positions thereon; a forming process is then conducted by applying pressure by means of clamping; and after the forming process, the covering material 16 is pushed against the recessed sections by the pins 5 so as to make holes in the covering material 16.

With the above method, the forming process is conducted with the covering material 16 such as the woven fabric 6 being held between the pins 5. The covering material 16 is then pushed against the recessed sections by the pins 5, thereby making holes in the covering material 16. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the pins 5 were previously disposed, and the through holes 8 are not covered with the covering material 16. Therefore, this method makes it possible to easily produce a multi-layer molded-product that is consisted of the base plate 17 made of thermoplastic resin having through holes 8 which are not covered with the covering material 16.

Still another manufacturing method for the multi-layer molded-products in accordance with the present invention is characterized in that: molten thermoplastic resin 7 is supplied to the cavity with the covering material 16 such as a woven fabric 6 being tightly pushed against the recessed sections so as to make holes in the covering material 16 by the use of the protrusions 5e that are formed on the molding face of the lower mold 2 so as to fit to the recessed sections formed in the molding face of the upper mold 1; and a forming process is then conducted by applying pressure by means of clamping.

With the above method, the forming process is conducted with the covering material 16 such as the woven fabric 6 being tightly pushed against the molding face of the upper mold 1. Thus, it is possible to easily produce a multi-layer molded-product wherein the covering material 16 such as the woven fabric 6 is entangledly fused to and integrally formed on the surface of the thermoplastic resin. Moreover, this multi-layer molded-product has through holes 8 formed therein at places where the pin 5 were previously disposed, and the through holes 8 are not covered with the covering material 16. Therefore, this method makes it possible to easily produce a multi-layer molded-product that is consisted of the base plate 17 made of thermoplastic resin having through holes 8 which are not covered with the covering material 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method for a molded-product comprising a base plate having at least one through hole and a covering material for covering a surface of the base plate, comprising the steps of:

pushing a covering material against a recessed section formed in a molding face of a mold by the use of a protrusion formed on a molding face of an opposing mold so as to fit the protrusion to the recessed section in such a manner as to make a hole in the covering material;

supplying molten thermoplastic resin to a cavity formed between said molds, said step of supplying following said step of pushing; and executing a forming process by closing said molds and thereby molding the thermoplastic resin so as to obtain a base plate having a through hole at a portion that is occupied by the protrusion and entangledly fusing the remaining covering material to a surface of the base plate.

2. The method according to claim 1, wherein said covering material is selected from the group consisting of fabric, netting, perforated metal or resin plates, thermoplastic resins, thermoplastic elastomers, and rubbers.

3. The method according to claim 1, wherein said covering material is selected from the group consisting of woven fabric and non-woven fabric.

4. The method according to claim 1, wherein said covering material is selected from the group consisting of thermoplastic resins.

5. The method according to claim 4, wherein said thermoplastic resin is a foamed thermoplastic resin.

6. The method according to claim 1, wherein said covering material is metal mesh.

7. The method according to claim 1, wherein said executing step is carried out by applying pressure to the molds by a clamping means.

8. A manufacturing method for a molded-product comprising a base plate having at least one through hole and a covering material for covering a surface of the base plate, comprising the steps of:

pushing a covering material against a movable member fitted to a recessed section formed in a molding face of a mold by the use of a protrusion provided on an opposing molding face so as to form a hole in the covering material;

supplying molten thermoplastic resin to a cavity formed in the mold, said step of supplying following said step of pushing; and executing a forming process by closing said mold and thereby molding the thermoplastic resin so as to obtain a base plate having a through hole at a portion that is occupied by the movable member and entangledly fusing the remaining covering material to a surface of the base plate.

9. The method according to claim 8, wherein said executing step is carried out by applying pressure to the mold by a clamping means.

10. A manufacturing method for a molded-product comprising a base plate having at least one through hole and a covering material for covering a surface of the base plate, comprising the steps of:

holding a covering material between movable members that are moved up and down, said movable members being fitted to recessed sections that are formed in molding faces of the mold so as to be aligned face to face with each other;

supplying molten thermoplastic resin to a cavity formed in the mold, said step of supplying following said step of holding;

executing a forming process by closing the mold and thereby molding the thermoplastic resin so as to obtain a base plate having a through hole at a portion that is occupied by the movable members and entangledly fusing the covering material to a surface of the base plate; and pushing the covering material against one of the recessed sections by the use of the movable members so as to make a hole in the covering material, said step of pushing following said step of executing.

11. The method according to claim 10, wherein said executing step is carried out by applying pressure to the mold by a clamping means.

12. A manufacturing method for a molded-product comprising a base plate having at least one through hole and a covering material for covering a surface of the base plate, comprising the steps of:

pushing a covering material against a molding face of a mold by the use of a movable member that is moved up and down;

supplying molten thermoplastic resin to a cavity formed in the mold, said step of supplying following said step of pushing; and executing a forming process by closing the mold and thereby molding the thermoplastic resin so as to obtain a base plate having a through hole at a portion that is occupied by the movable member and entangledly fusing the covering material to a surface of the base plate in a manner covering the through hole, wherein said executing step is carried out by applying pressure to the mold by a clamping means.

* * * * *